US012308555B2

(12) United States Patent
Yamada

(10) Patent No.: US 12,308,555 B2
(45) Date of Patent: May 20, 2025

(54) CONNECTOR INCLUDING INNER CONDUCTOR, OUTER CONDUCTOR, AND HOUSING HOLDING THE OUTER CONDUCTOR

(71) Applicant: SUMITOMO WIRING SYSTEMS, LTD., Mie (JP)

(72) Inventor: Shuhei Yamada, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 343 days.

(21) Appl. No.: 17/875,773

(22) Filed: Jul. 28, 2022

(65) Prior Publication Data

US 2023/0030972 A1 Feb. 2, 2023

(30) Foreign Application Priority Data

Aug. 2, 2021 (JP) ................................ 2021-126542

(51) Int. Cl.

*H01R 13/504* (2006.01)
*H01R 12/71* (2011.01)
*H01R 13/506* (2006.01)
*H01R 13/516* (2006.01)
*H01R 13/518* (2006.01)
*H01R 13/6581* (2011.01)

(Continued)

(52) U.S. Cl.

CPC ....... *H01R 13/5045* (2013.01); *H01R 12/716* (2013.01); *H01R 13/504* (2013.01); *H01R 13/506* (2013.01); *H01R 13/516* (2013.01); *H01R 13/518* (2013.01); *H01R 13/6581* (2013.01); *H01R 12/71* (2013.01); *H01R 12/712* (2013.01); *H01R 12/724* (2013.01); *H01R 13/502* (2013.01); *H01R 13/648* (2013.01); *H01R 13/658* (2013.01); *H01R 24/50* (2013.01); *H01R 24/86* (2013.01)

(58) Field of Classification Search

CPC ............. H01R 13/5045; H01R 12/716; H01R 13/504; H01R 13/506; H01R 13/516; H01R 13/518; H01R 13/6581; H01R 12/71; H01R 12/712; H01R 12/724; H01R 13/502; H01R 13/648; H01R 13/658; H01R 24/50; H01R 24/86

See application file for complete search history.

(56) References Cited

U.S. PATENT DOCUMENTS

| | | |
|---|---|---|
| 5,215,470 A | 6/1993 | Henry et al. |
| 2003/0114048 A1 | 6/2003 | Hall et al. |

(Continued)

FOREIGN PATENT DOCUMENTS

| | | |
|---|---|---|
| JP | 2019-012635 A | 1/2019 |

*Primary Examiner* — Justin M Kratt

(74) *Attorney, Agent, or Firm* — Venjuris, P.C.

(57) ABSTRACT

A connector is provided with electrically conductive inner conductors, an outer conductor made of die casting and configured to surround the inner conductors, and an insulating housing including a holding recess extending in a vertical direction in a front end of the insulating housing and into which the outer conductor is mounted. A lower end of the holding recess is open in a bottom surface of the front end of the insulating housing. Moreover, the connector further includes a coupling member including a holding protrusion fit into the holding recess from below and configured to couple the outer conductor and the housing to each other.

6 Claims, 13 Drawing Sheets

(51) Int. Cl.

| | |
|---|---|
| *H01R 12/72* | (2011.01) |
| *H01R 13/502* | (2006.01) |
| *H01R 13/648* | (2006.01) |
| *H01R 13/658* | (2011.01) |
| *H01R 24/50* | (2011.01) |
| *H01R 24/86* | (2011.01) |

(56) References Cited

U.S. PATENT DOCUMENTS

| | | | | |
|---|---|---|---|---|
| 2004/0157498 | A1 | 8/2004 | Hall et al. | |
| 2018/0366843 | A1 | 12/2018 | Maki | |
| 2019/0109420 | A1 | 4/2019 | Hasenöhrl | |
| 2020/0227873 | A1 | 7/2020 | Hasenöhrl et al. | |
| 2021/0344147 | A1 | 11/2021 | Hasenöhrl et al. | |
| 2022/0166164 | A1* | 5/2022 | Miyanari ............. | H01R 13/629 |

* cited by examiner

CONNECTOR INCLUDING INNER CONDUCTOR, OUTER CONDUCTOR, AND HOUSING HOLDING THE OUTER CONDUCTOR

CROSS-REFERENCE TO RELATED APPLICATIONS

This application is based on and claims priority from Japanese Patent Application No. 2021-126542, filed on Aug. 2, 2021, with the Japan Patent Office, the disclosure of which is incorporated herein in its entirety by reference.

TECHNICAL FIELD

The present disclosure relates to a connector.

BACKGROUND

A connector disclosed in Japanese Patent Laid-open Publication No. 2019-071272 (FIGS. 12 to 14) is provided with an inner conductor called an internal conductive portion, a contact body, a plug body and a housing called a coding housing.

The housing is made of synthetic resin. The inner conductor, the contact body and the plug body are made of metal. Out of these, the plug body is made of die casting. The contact body and the plug body are assembled with each other to constitute an outer conductor. The outer conductor surrounds the outer periphery of the inner conductor. The contact body is tubular and inserted from the housing to the plug body. The plug body is mounted into the housing from a direction intersecting an inserting direction of the contact body. The contact body is fixed to the plug body by soldering, welding or the like. Such techniques on connectors are also disclosed in Japanese Patent Laid-open Publication Nos. 2019-012635, 2019-003856, 2004-241385, 2003-197327 and H06-060943.

SUMMARY

The outer conductor made of die casing cannot be provided with a resilient lock to be resiliently locked to the housing. In contrast, it is possible to provide the housing made of synthetic resin with a resilient lock, but the resilient lock may be broken. Thus, a simple locking structure such as the press-fitting of the outer conductor into the housing has to be adopted and there is a concern for lacking reliability in holding the outer conductor.

Accordingly, the present disclosure aims to provide a connector capable of improving the holding performance of an outer conductor made of die casting in a housing.

The present disclosure is directed to a connector with an electrically conductive inner conductor, an outer conductor made of die casting for surrounding the inner conductor, an insulating housing, the outer conductor being mounted into the housing, and a coupling member for coupling the outer conductor and the housing to each other.

According to the present disclosure, it is possible to provide a connector capable of improving the holding performance of an outer conductor made of die casting in a housing.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
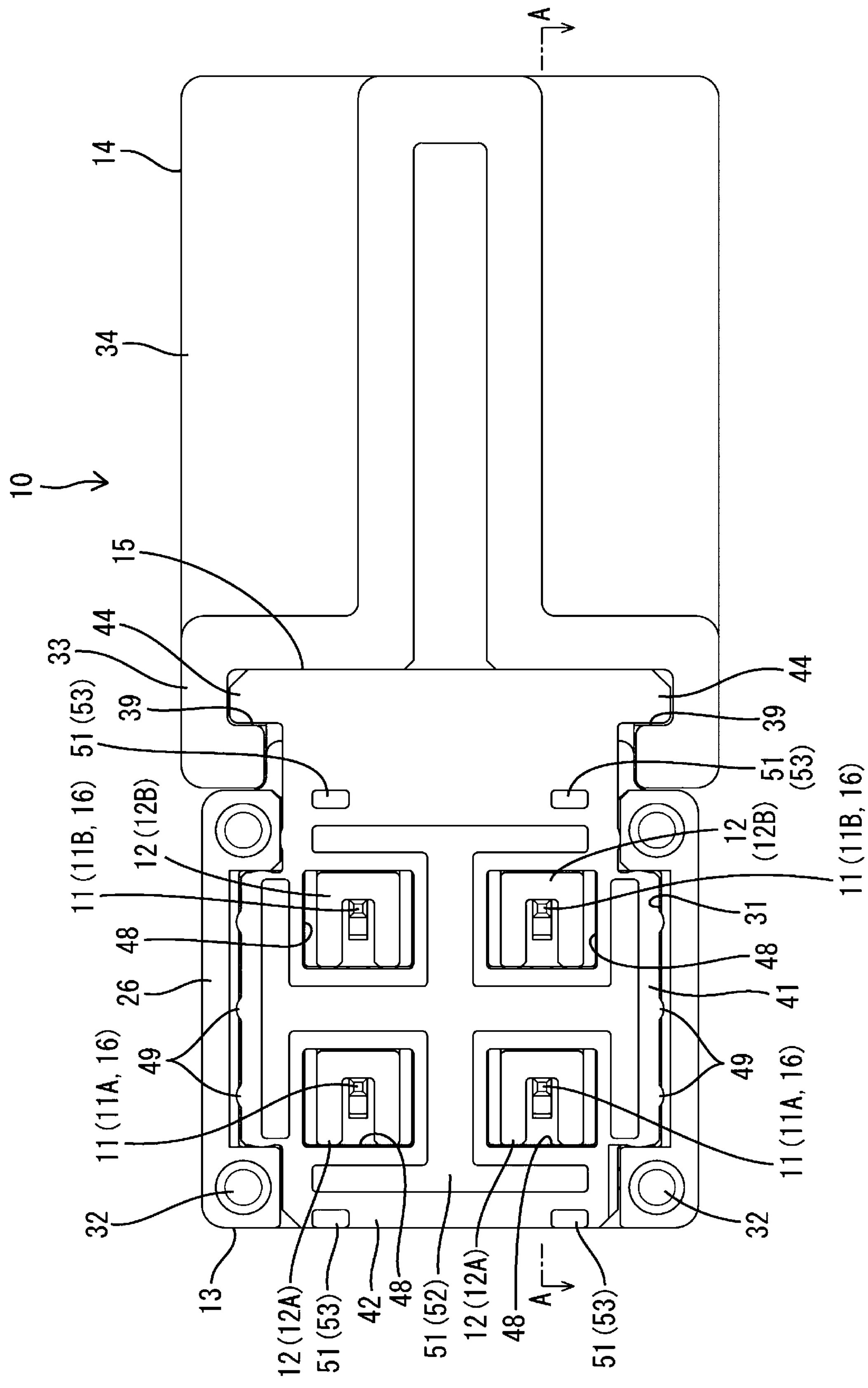
FIG. 1 is a bottom view of a connector of an embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

(1) The connector of the present disclosure is provided with an electrically conductive inner conductor, an outer conductor made of die casting for surrounding the inner conductor, an insulating housing, the outer conductor being mounted into the housing, and a coupling member for coupling the outer conductor and the housing to each other.

According to this configuration, since the outer conductor made of die casting and the housing are coupled to each other via the coupling member, the holding performance of the outer conductor in the housing can be improved.

(2) Preferably, the housing includes a holding recess, the coupling member includes a holding protrusion to be fit into the holding recess, and the holding recess and the holding protrusion are formed to extend in a direction intersecting a mounting direction of the outer conductor into the housing.

According to this configuration, the coupling member and the housing can be prevented from being separated from each other.

(3) The inner conductor may include a pull-out portion to be located on a back surface side of the outer conductor, and the coupling member may be electrically conductive and include a back surface shielding portion for covering the pull-out portion from the back surface side.

According to this configuration, the pull-out portion of the inner conductor is covered by the back surface shielding portion without being exposed on the back surface side. If the coupling member has shielding performance in this way, a dedicated shield cover or the like for closing the back surface of the housing is not necessary and an entire configuration can be simplified.

(4) The inner conductor may be connected to a circuit board, and the coupling member may include a bottom portion to be arranged sandwiched between the outer conductor and the circuit board.

According to this configuration, the bottom portion can be kept between the outer conductor and the circuit board and the separation of the coupling member from the outer conductor with the connector installed on the circuit board can be prevented without providing any special locking structure.

(5) The coupling member may be electrically conductive, and the bottom portion of the coupling member may include an opening for surrounding an outer periphery of the inner conductor over an entire periphery.

According to this configuration, by arranging the inner conductor in the opening of the bottom portion, shielding performance can be improved and impedance matching can be achieved.

Details of Embodiment of Present Disclosure

A specific example of an embodiment of the present disclosure is described below with reference to the drawings. Note that the present invention is not limited to this illustration and is intended to be represented by claims and include all changes in the scope of claims and in the meaning and scope of equivalents.

Figure 2:
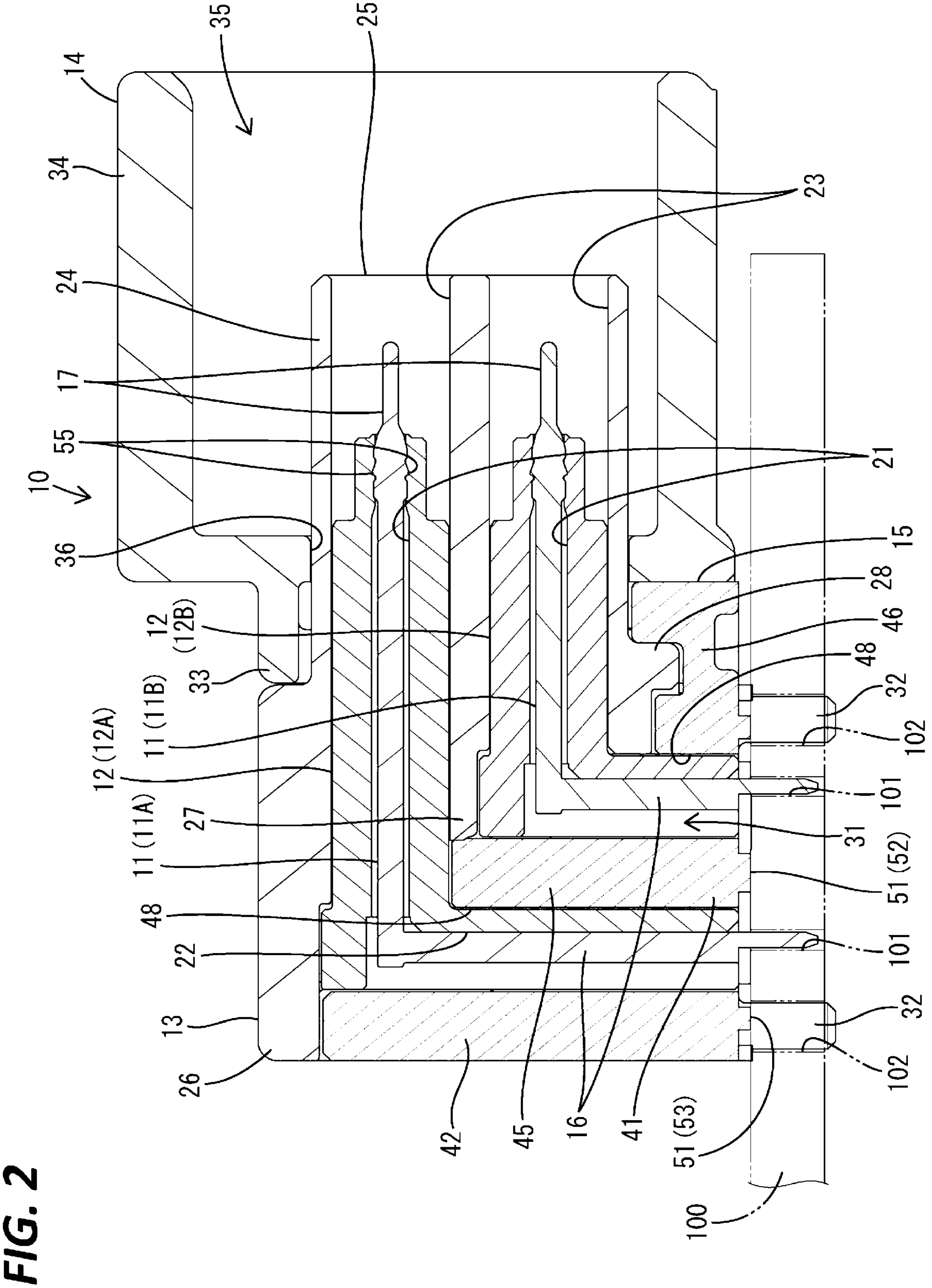
FIG. 2 is a section along A-A of FIG. 1.

A connector 10 of this embodiment is illustrated as a board connector to be mounted on a circuit board 100 as shown in FIG. 2. As shown in FIGS. 1 and 2, the connector 10 includes inner conductors 11, dielectrics 12, an outer conductor 13, a housing 14 and a coupling member 15. The housing 14 is connectable to an unillustrated mating connector. Note that, in the following description, a side to be connected to the mating connector is referred to as a front side concerning a front-rear direction. A right side of FIGS. 1 and 2 is a front side. A side of the circuit board 100 with the connector 10 is referred to as a lower side concerning a vertical direction. A vertical direction in FIGS. 2 to 7, 9, 11 and 13 is a vertical direction.

<Inner Conductors>

The inner conductor 11 is made of an electrically conductive metal plate material and, as shown in FIG. 2, formed into an elongated shape as a whole. The inner conductor 11 includes a pull-out portion 16 extending in the vertical direction and an extending portion 17 extending forward from the upper end of the pull-out portion 16. A lower end part of the pull-out portion 16 is inserted into a through hole 101 of the circuit board 100 and soldered and connected to an electrically conductive part of the circuit board 100. A front end part of the extending portion 17 is connected to an unillustrated mating inner conductor at the time of connection to the mating connector. In the case of this embodiment, the inner conductors 11 include first inner conductors 11A and second inner conductors 11B shorter than the first inner conductors 11A.

<Dielectrics>

Figure 6:
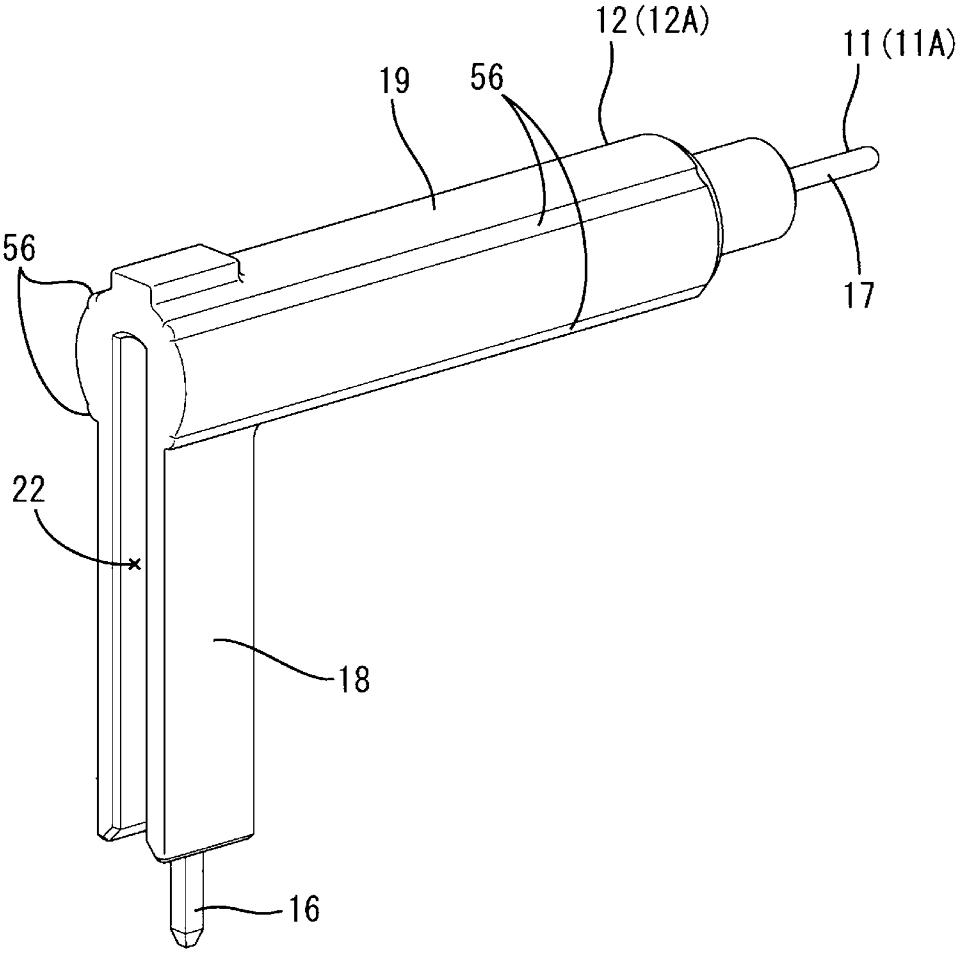
FIG. 6 is a perspective view of a first dielectric having a first inner conductor mounted therein.
Figure 7:
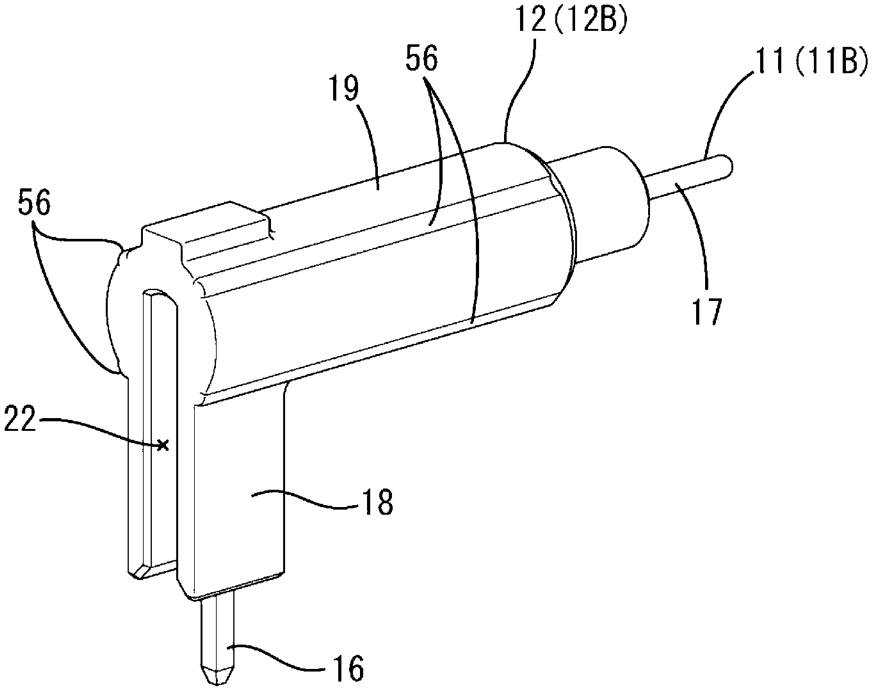
FIG. 7 is a perspective view of a second dielectric having a second inner conductor mounted therein.

The dielectric 12 is made of an insulating synthetic resin material and formed into an L shape in a side view as a whole. As shown in FIGS. 6 and 7, the dielectric 12 includes a terminal extending portion 18 extending in the vertical direction and a terminal mounting portion 19 extending forward from the upper end of the terminal extending portion 18. As shown in FIG. 2, the terminal mounting portion 19 is formed with a mounting hole 21 penetrating in the front-rear direction. The extending portion 17 of the inner conductor 11 is inserted into the mounting hole 21 from behind. As shown in FIGS. 6 and 7, the terminal extending portion 18 is formed with an extending groove 22 extending in the vertical direction. The extending groove 22 is open in the rear and lower surfaces of the dielectric 12. The upper end of the extending groove 22 communicates with the rear end of the mounting hole 21. The pull-out portion 16 of the inner conductor 11 is arranged along the extending groove 22. In the case of this embodiment, the dielectrics 12 include first dielectrics 12A (see FIG. 6) and second dielectrics 12B (see FIG. 7) shorter and smaller than the first dielectrics 12A. The first inner conductors 11A are mounted into the terminal mounting portions 19 of the first dielectrics 12A. The second inner conductors 11B are mounted into the terminal mounting portions 19 of the second dielectrics 12B.

<Outer Conductor>

Figure 9:
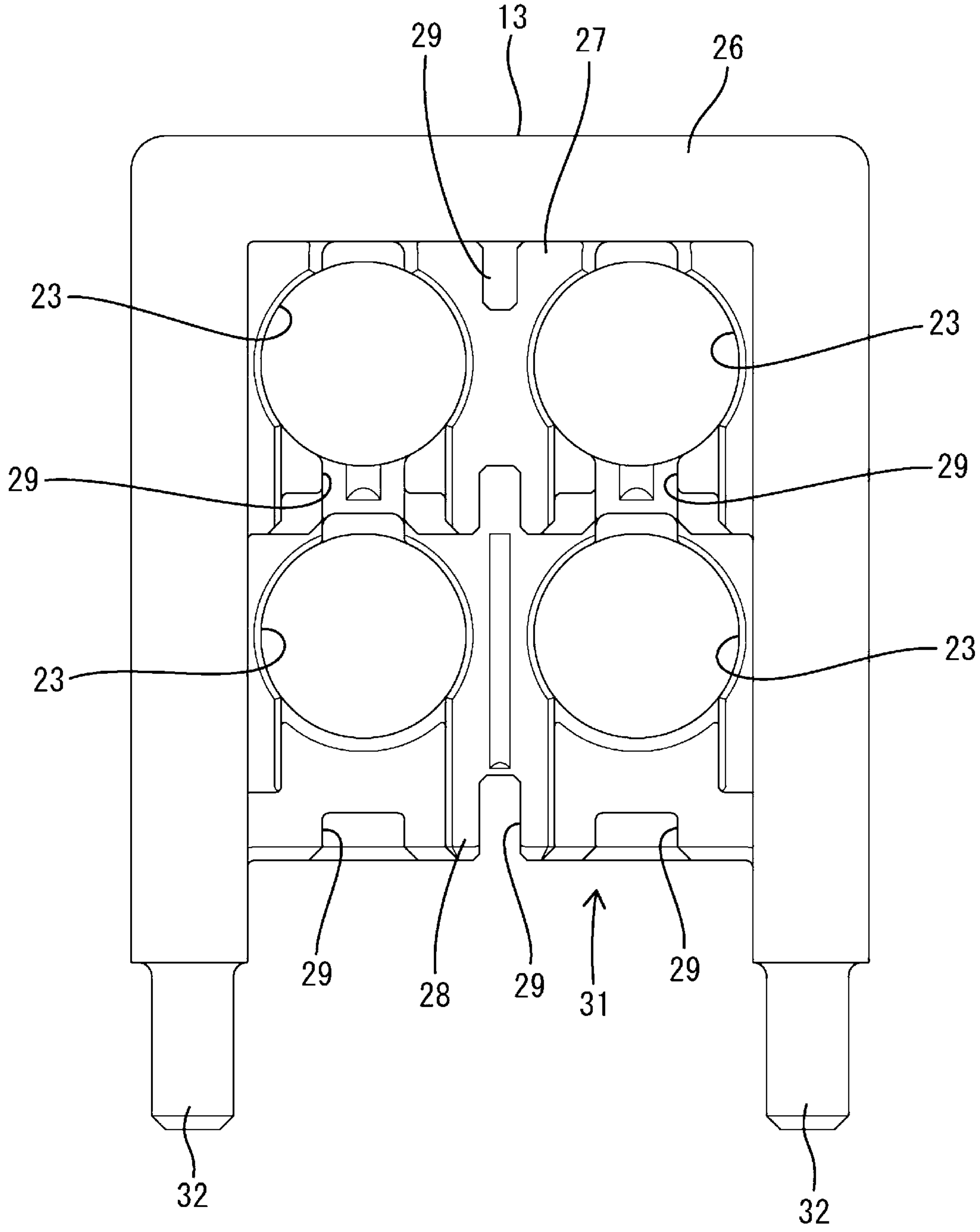
FIG. 9 is a back view of the outer conductor.

The outer conductor 13 is electrically conductive and, for example, configured as a die-cast member of zinc alloy or the like. As shown in FIG. 9, the outer conductor 13 is formed with four insertion holes 23 penetrating in the front-rear direction. The four insertion holes 23 are composed of two pairs of left and right insertion holes 23 in upper and lower parts of the outer conductor 13. Each insertion hole 23 is open rearward of the outer conductor 13. The dielectric 12 is insertable into each insertion hole 23 from behind.

Figure 5:
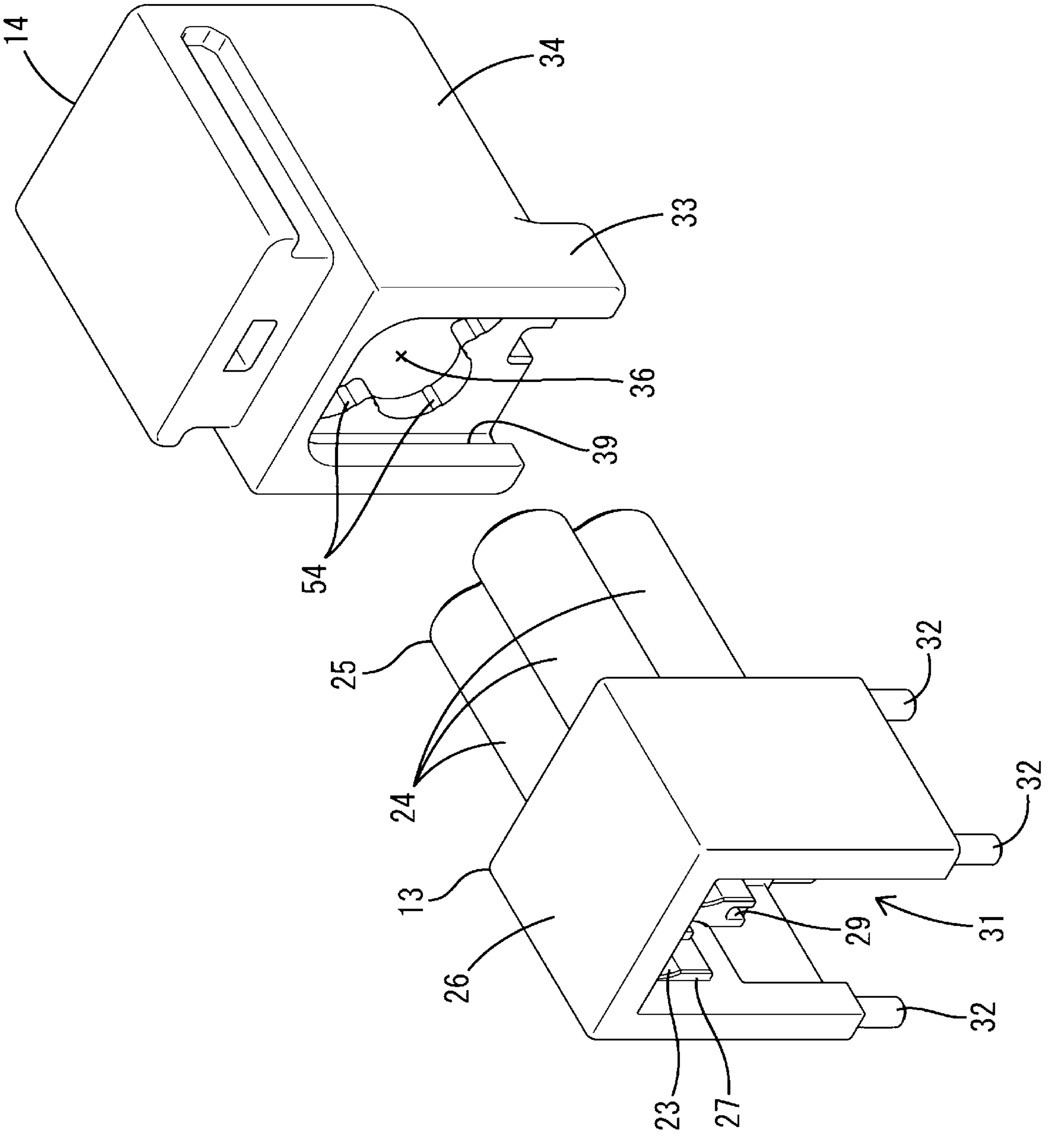
FIG. 5 is a perspective view showing a state before the outer conductor is assembled with the housing.

As shown in FIG. 5, a multiple cylinder portion 25 formed by integrally coupling four cylinders 24 (three cylinders 24 are shown in FIG. 5) is formed in a front part of the outer conductor 13. As shown in FIG. 2, a front part of each insertion hole 23 is formed in the cylinder 24 of the multiple cylinder portion 25.

Figure 8:
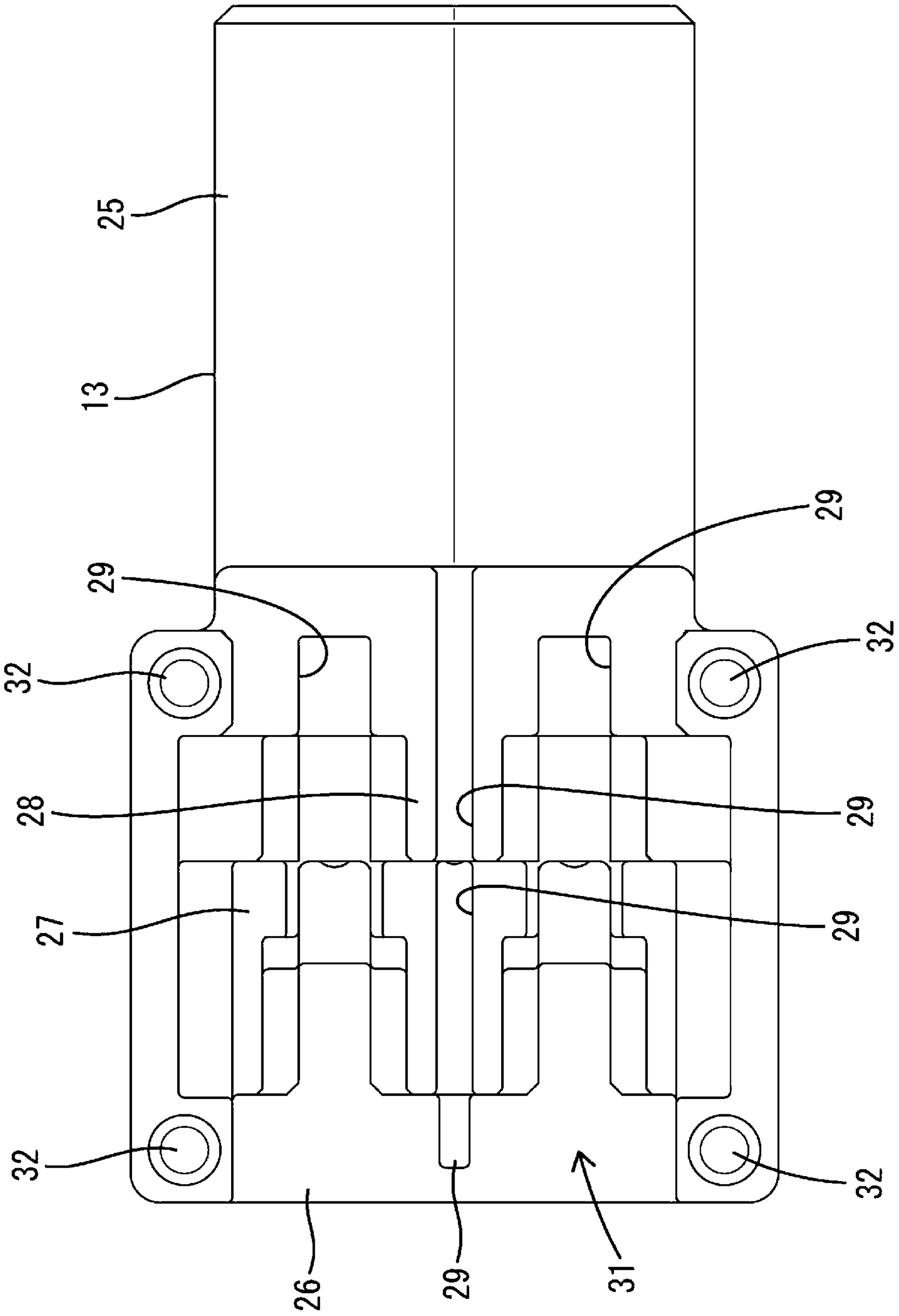
FIG. 8 is a bottom view of the outer conductor.

As shown in FIG. 9, a surrounding portion 26 having a gate-like outer shape in a back view is formed in a rear part of the outer conductor 13. The surrounding portion 26 includes an upper-stage portion 27 located in the upper part of the outer conductor 13 and a lower-stage portion 28 located in the lower part of the outer conductor 13. The upper-stage portion 27 and the lower-stage portion 28 are connected in a stepped manner. As shown in FIG. 8, the rear surface of the upper-stage portion 27 is arranged to be recessed forward from the rear end of the surrounding portion 26. The rear surface of the lower-stage portion 28 is arranged to be recessed forward from the rear surface of the upper-stage portion 27. As shown in FIG. 2, the insertion holes 23 in the upper part of the outer conductor 13 are formed to penetrate through the upper-stage portion 27. The insertion holes 23 in the lower part of the outer conductor 13 are formed to penetrate through the lower-stage portion 28. Further, as shown in FIGS. 8 and 9, each of the upper-stage portion 27 and the lower-stage portion 28 is formed with a plurality of fitting receiving portions 29. Each fitting receiving portion 29 is in the form of a projection or recess extending in the front-rear direction. In the surrounding portion 26, a holding space 31 is formed below each of the upper-stage portion 27 and the lower-stage portion 28. The holding space 31 is open rearward and downward of the surrounding portion 26. As shown in FIGS. 1 and 2, the coupling member 15 is inserted into the holding space 31 of the surrounding portion 26 from below.

A pair of front and rear leg portions 32 are formed to project downward from a lower end part of each of left and right side walls of the surrounding portion 26. Each leg portion 32 is inserted into each positioning hole 102 of the circuit board 100. In this way, the connector 10 is positioned and arranged on the circuit board 100.

<Housing>

Figure 11:
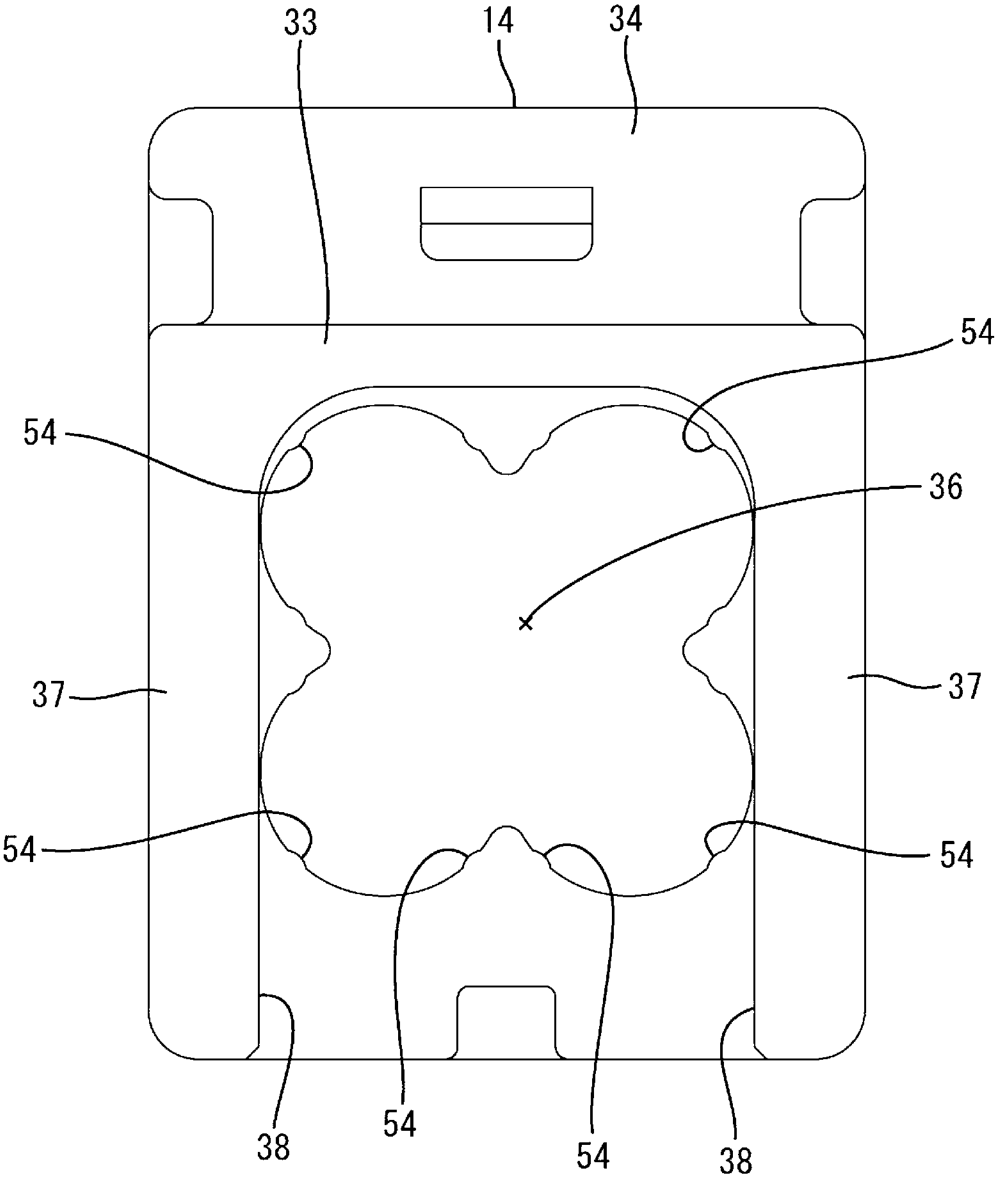
FIG. 11 is a back view of the housing.

The housing 14 is made of an insulating synthetic resin material and includes a base portion 33 having a rectangular outer shape in a back view as shown in FIG. 11 and a receptacle 34 projecting forward from the base portion 33 as shown in FIG. 2. A fitting space 35 is formed in the receptacle 34. The unillustrated mating connector is fit into the fitting space 35 of the receptacle 34 from front.

As shown in FIG. 11, a through hole 36 is formed to penetrate through the base portion 33 in the front-rear direction. The through hole 36 has a cross-sectional shape corresponding to the outer shape of the multiple cylinder portion 25 of the outer conductor 13 and communicates with the fitting space 35. As shown in FIG. 2, the multiple cylinder portion 25 of the outer conductor 13 is arranged to project into the fitting space 35 through the through hole 36.

Figure 10:
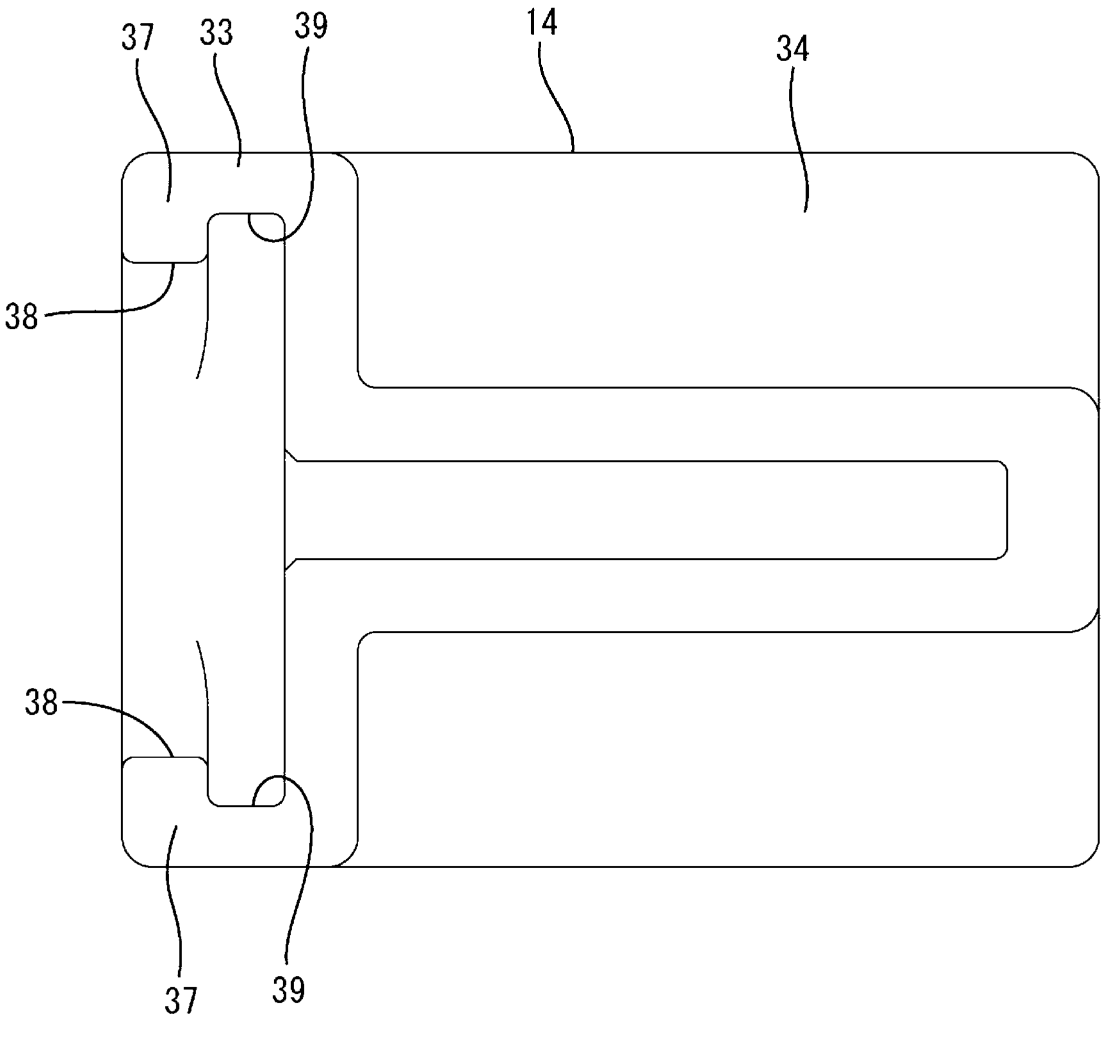
FIG. 10 is a bottom view of the housing.

As shown in FIG. 10, the base portion 33 is formed with a pair of left and right guide portions 37. The respective guide portions 37 are in the form of ribs extending in the vertical direction and have facing surfaces 38 laterally facing each other. As shown in FIG. 10, a pair of left and right holding recesses 39 are formed to be open in the facing surfaces 38 of the respective guide portions 37. Each holding recess 39 extends in the vertical direction along each guide portion 37 and the lower end thereof is open in the lower surface of the base portion 33. As shown in FIG. 1, a later-described holding protrusion 44 of the coupling member 15 is inserted into each holding recess 39.

<Coupling Member>

Figure 4:
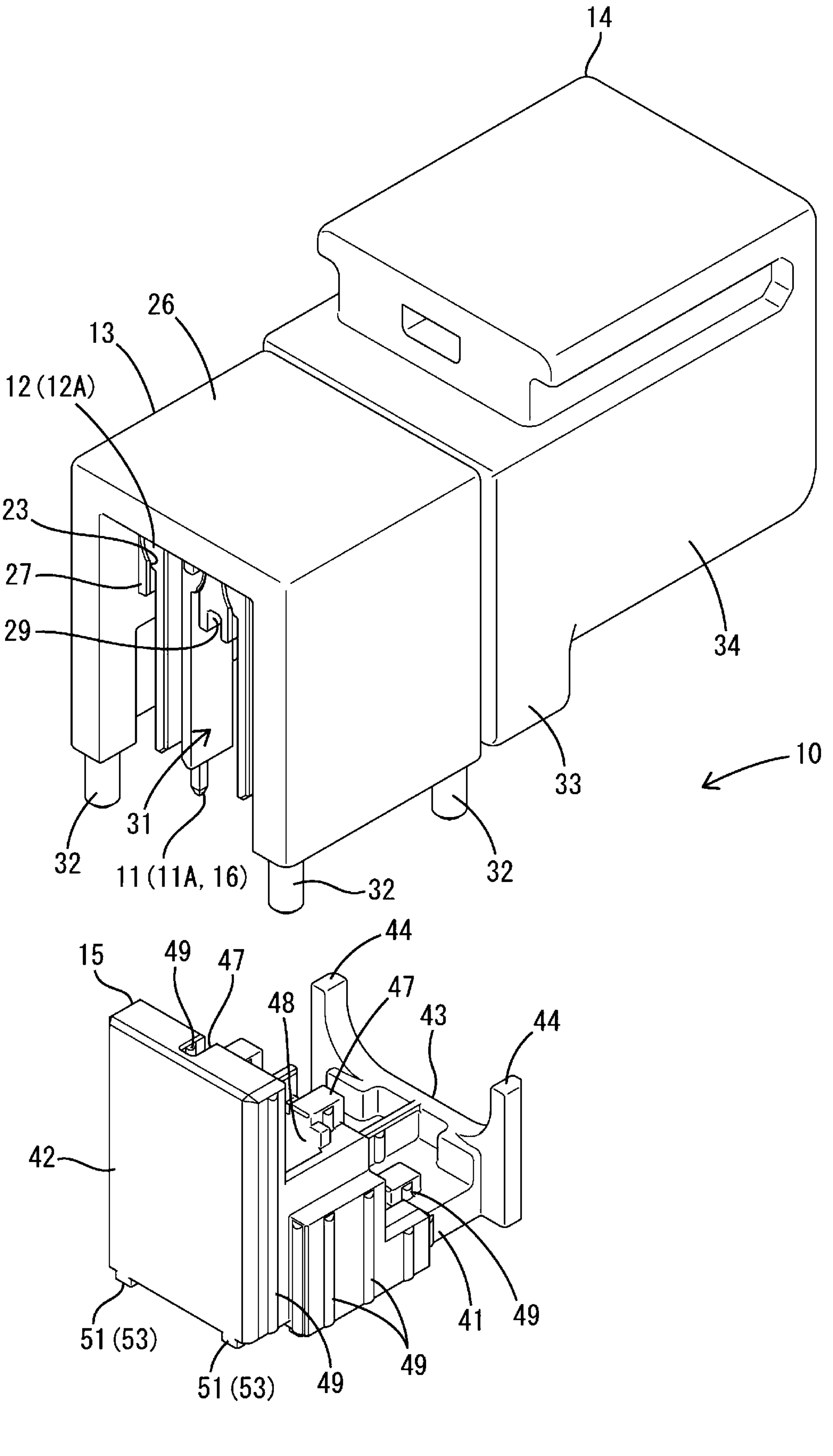
FIG. 4 is a perspective view showing a state before a coupling member is assembled with an outer conductor and a housing.
Figure 12:
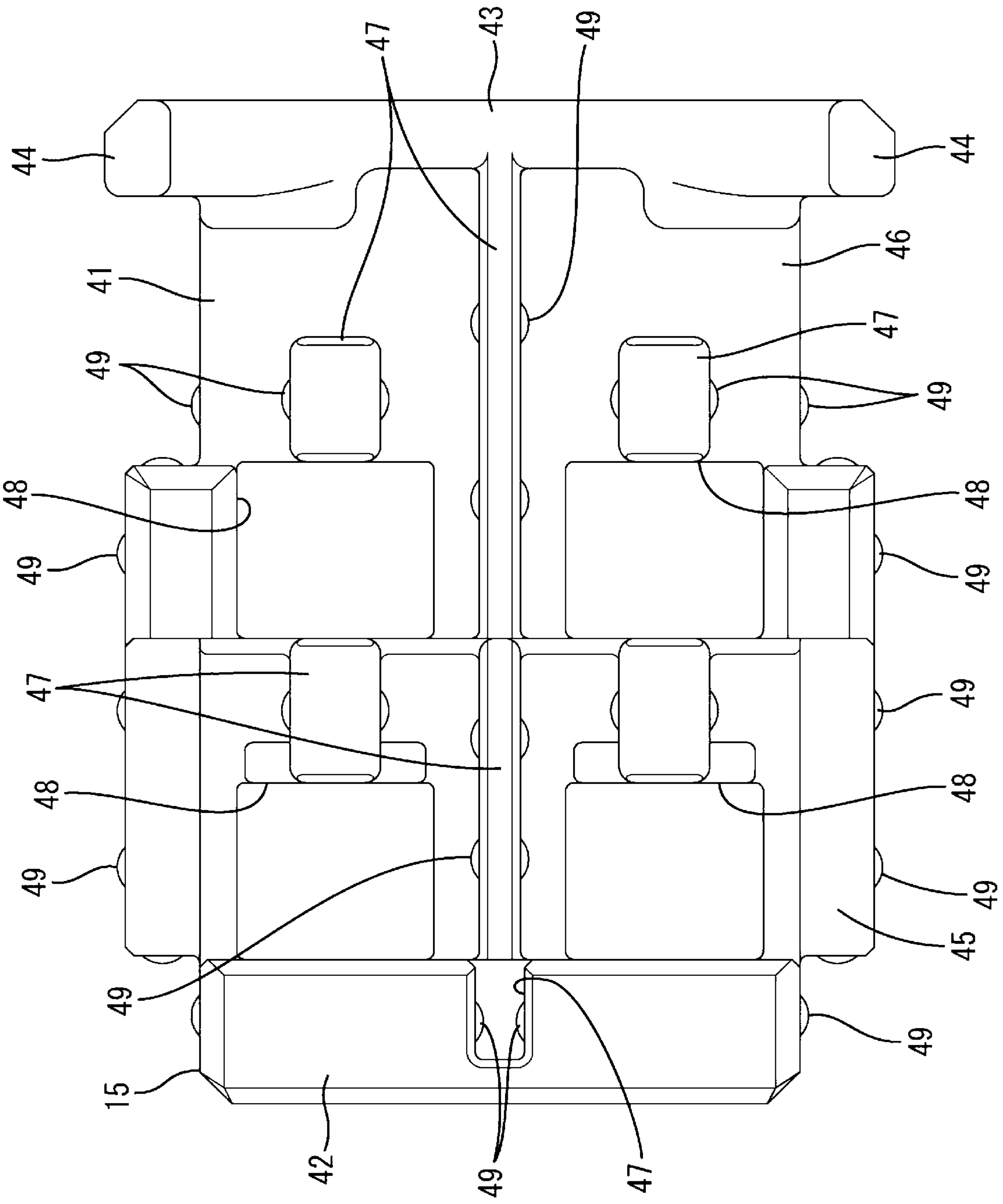
FIG. 12 is a back view of the coupling member.
Figure 13:
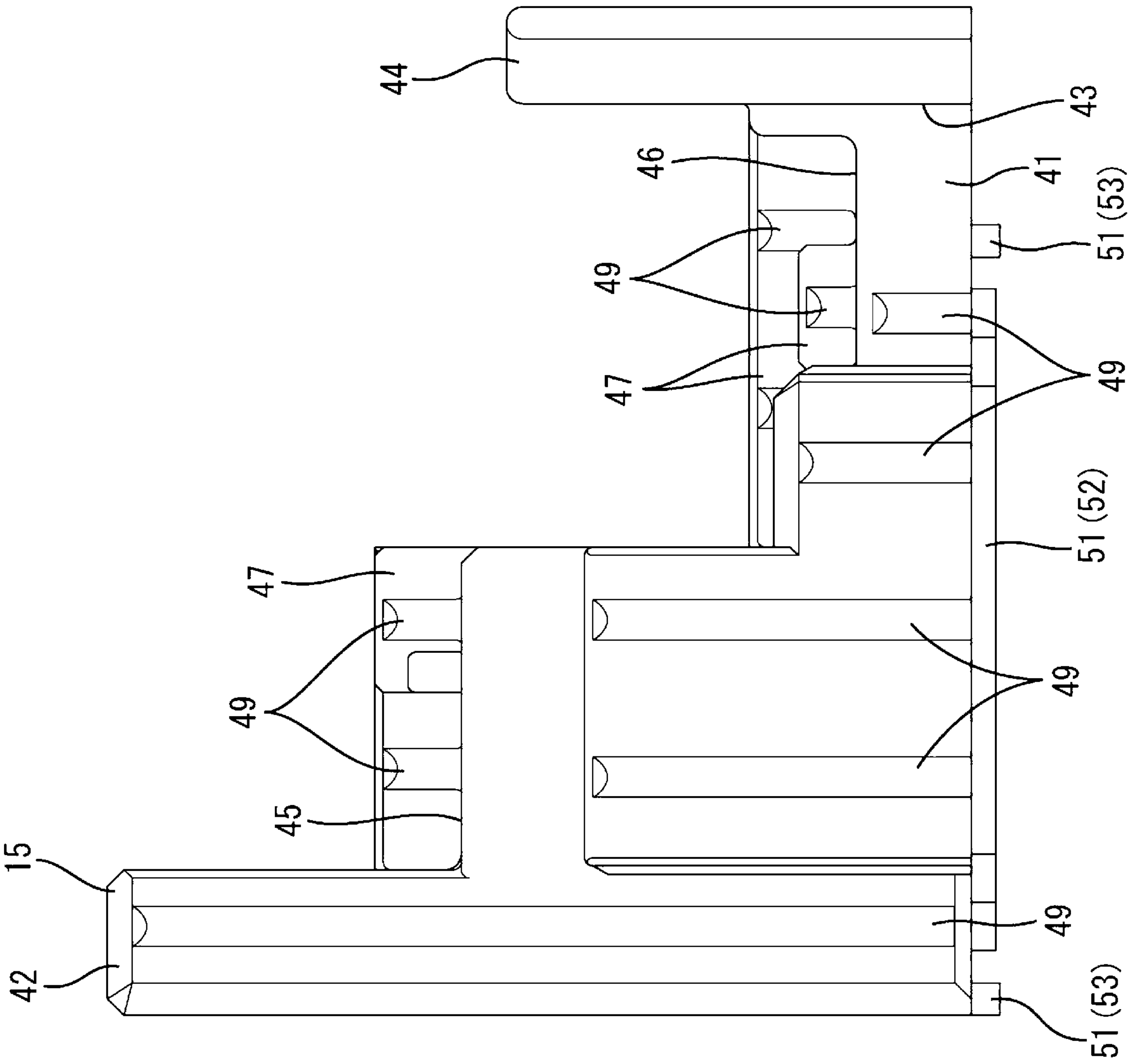
FIG. 13 is a side view of the coupling member.

The coupling member 15 is electrically conductive and, for example, configured as a die-cast member of zinc, zinc alloy or the like. As shown in FIGS. 4, 12 and 13, the coupling member 15 includes a bottom portion 41, a back surface shielding portion 42 connected to the rear end of the bottom portion 41, an end wall portion 43 connected to the front end of the bottom portion 41 and a pair of left and right holding protrusions 44 connected to left and right end parts of the end wall portion 43.

Figure 3:
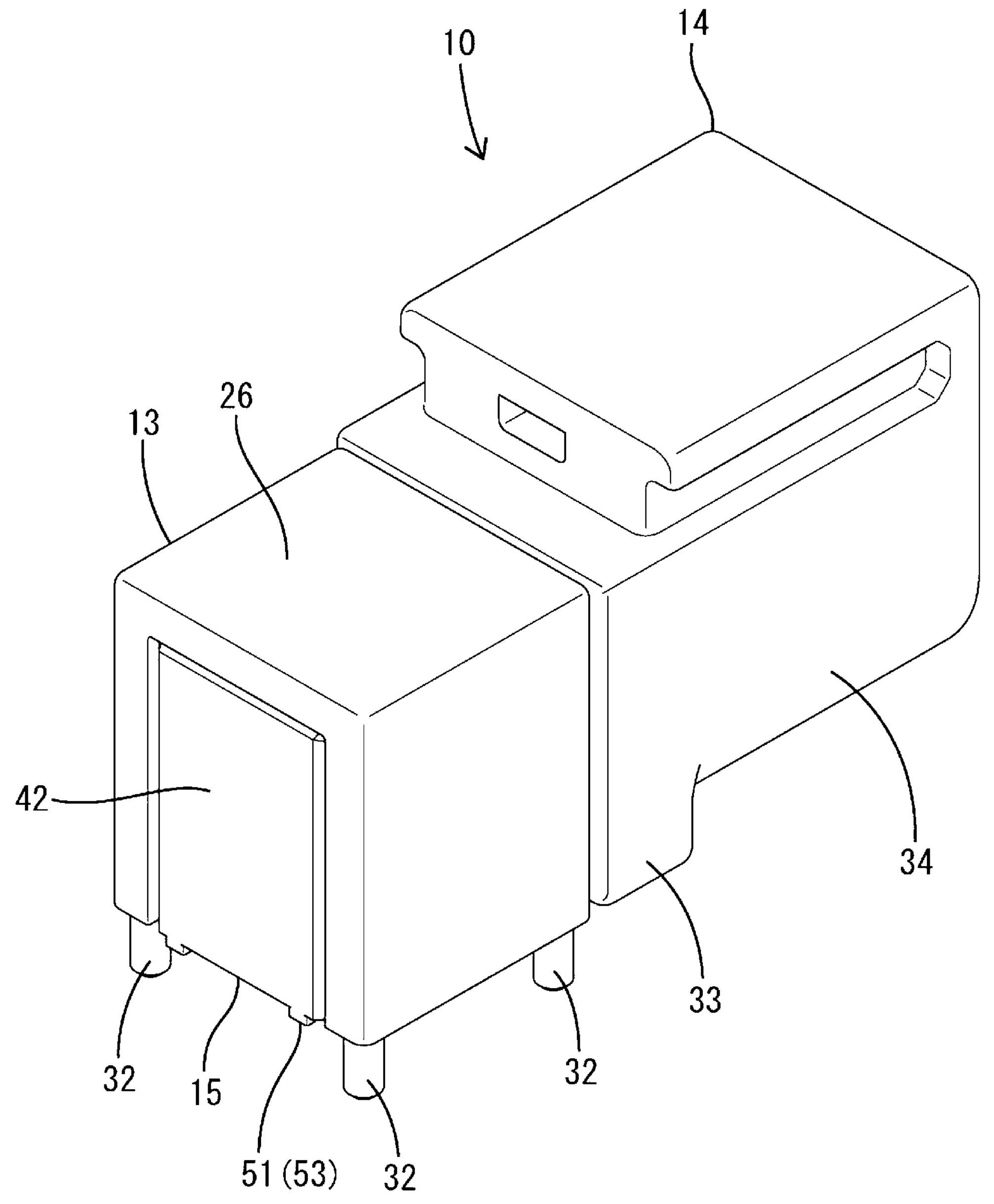
FIG. 3 is a perspective view of the connector.

As shown in FIGS. 3 and 4, the back surface shielding portion 42 has a rectangular outer shape in a back view. As shown in FIG. 2, the bottom portion 41 includes a high-height portion 45 capable of contacting the upper-stage portion 27 of the outer conductor 13 and a low-height portion 46 capable of contacting the lower-stage portion 28 of the outer conductor 13. As shown in FIG. 13, the high-height portion 45 is connected to the back surface shielding portion 42. The low-height portion 46 is shorter than the high-height portion 45 and connected to the front end of the high-height portion 45 in a stepped manner. As shown in FIGS. 12 and 13, a plurality of fitting portions 47 are formed on the upper surfaces of the back surface shielding portion 42, the low-height portion 46 and the high-height portion 45. Each fitting portion 47 is in the form of a recess or projection extending in the front-rear direction and fit to each fitting receiving portion 29 of the outer conductor 13 in a concave-convex manner. In the case of this embodiment, the recess-like fitting portion 47 is formed in the back surface shielding portion 42, and the projection-like fitting portions 47 are formed on the low-height portion 46 and the high-height portion 45.

As shown in FIGS. 1 and 12, four openings 48 are formed to penetrate through the bottom portion 41 in the vertical direction. Each opening 48 has a rectangular opening shape in a bottom view and a pair of left and right openings 48 are formed in each of the low-height portion 46 and the high-height portion 45. Each dielectric 12 is inserted into each opening 48. As shown in FIG. 2, the second dielectrics 12B are inserted into the openings 48 of the low-height portion 46, and the first dielectrics 12A are inserted into the openings 48 of the high-height portion 45.

As shown in FIG. 13, a plurality of ribs 49 extending long in the vertical direction are formed on the outer surface of the coupling member 15. The respective ribs 49 are arranged at intervals in the front-rear direction on left and right side surfaces of the respective back surface shielding portion 42, high-height portion 45 and low-height portion 46.

As shown in FIG. 12, the ribs 49 are also formed on the inner surface of the coupling member 15. Specifically, the ribs 49 are formed on left and right side surfaces of the respective fitting portions 47. The respective ribs 49 formed on the outer surface of the coupling member 15 can contact the inner surface of the holding space 31 (see FIG. 1), and the respective ribs 49 formed on the inner surface of the coupling member 15 can contact the fitting receiving portions 29.

The end wall portion 43 is inserted between the respective guide portions 37 in the base portion 33. The pair of left and right holding protrusions 44 are formed to stand on left and right end parts of the end wall portion 43. Specifically, each holding protrusion 44 has a rectangular cross-sectional shape and is formed to extend in the vertical direction. Each holding protrusion 44 is inserted into each holding recess 39. As shown in FIG. 4, to secure strength, the respective holding protrusions 44 are gradually laterally widened toward the end wall portion 43 to form a U shape.

As shown in FIG. 1, projecting end portions 51 are formed on the lower surface of the coupling member 15. The projecting end portions 51 are composed of a peripheral portion 52 extending to surround the respective openings 48 and a pair of left and right supporting end portions 53 formed on each of front and rear sides across the peripheral portion 52. As shown in FIG. 2, the lower surfaces of the projecting end portions 51 are formed to be flat and disposed on a surface of the circuit board 100.

<Assembling Structure and Functions of Connector>

As shown in FIGS. 5 and 4, the multiple cylinder portion 25 of the outer conductor 13 is inserted into the through hole 36 of the base portion 33 of the housing 14 from behind. A rear part of the multiple cylinder portion 25 is press-fit and primarily held in the through hole 36 of the housing 14 via press-fit ribs 54 (see FIGS. 5 and 11).

The extending portion 17 of the inner conductor 11 is inserted into the mounting hole 21 of the terminal mounting portion 19 of the dielectric 12 from behind as shown in FIGS. 6 and 7. A rear part of the extending portion 17 is press-fit and held in the mounting hole 21 of the dielectric 12 via press-fit projections 55 (see FIG. 2).

As shown in FIG. 4, the dielectric 12 is inserted into the insertion hole 23 of the outer conductor 13 from behind. The terminal mounting portion 19 of the dielectric 12 is press-fit and held in the insertion hole 23 of the outer conductor 13 via ridge portions 56 (see FIGS. 6 and 7). As shown in FIG. 2, a front end part of the extending portion 17 of the inner conductor 11 is arranged to project into the insertion hole 23 of the multiple cylinder portion 25.

Note that an order of a step of assembling the outer conductor 13 with the housing 14, a step of assembling the inner conductors 11 with the dielectrics 12 and a step of assembling the dielectrics 12 with the outer conductor 13 is arbitrary without being particularly limited.

As shown in FIGS. 4 and 3, the coupling member 15 is mounted to straddle over the outer conductor 13 and the housing 14 from below in a direction intersecting the front-rear direction from a state where the outer conductor 13 is primarily held in the housing 14. If the coupling member 15 is properly mounted, the back surface shielding portion 42 closes the entire opening in the rear surface of the surrounding portion 26. Further, as shown in FIGS. 1 and 2, the back surface shielding portion 42 and the bottom portion 41 are entirely fit into the holding space 31 in the surrounding portion 26. Then, the respective ribs 49 contact the inner surface of the holding space 31 and the respective fitting receiving portions 29. In this way, the coupling member 15 is restricted from being separated downward from the outer conductor 13.

Further, if the coupling member 15 is properly mounted, the respective holding protrusions 44 are entirely fit into the respective holding recesses 39. Here, the rear surfaces of the respective holding protrusions 44 are contactably facing the inner surfaces of the respective holding recesses 39 (see FIG. 1), and the front surface of the high-height portion 45 is arranged to contactably face the rear surface of the lower-stage portion 28. In this way, the housing 14 and the outer conductor 13 are restricted from being separated from each other in the front-rear direction via the coupling member 15. As a result, the outer conductor 13 is reliably secondarily held in the housing 14.

As described above, since the back surface shielding portion 42 and the bottom portion 41 are fit into the holding space 31 to fill up the holding space 31 in the surrounding portion 26, the shielding performance of the outer conductor 13 can be complemented. Particularly, as shown in FIG. 2, the pull-out portions 16 of the first inner conductors 11A are covered from behind by the back surface shielding portion 42 and the pull-out portions 16 of the second inner conductors 11B are covered from behind by the high-height portion 45. As a result, the pull-out portion 16 of each inner conductor 11 is surrounded over an entire periphery by the opening 48 via the dielectric 12. Thus, shielding performance can be more improved.

Moreover, if the connector 10 is mounted on the circuit board 100, the projecting end portions 51 of the coupling member 15 are supported in contact with the surface of the circuit board 100. Here, the pull-out portion 16 of each inner conductor 11 is surrounded over the entire periphery by the peripheral portion 52, out of the projecting end portions 51, from the dielectric 12 to the circuit board 100. As a result, shielding performance can be even more improved and impedance matching can be achieved.

As just described, since the outer conductor 13 made of die casting and the housing 14 are coupled to each other via the coupling member 15 according to this embodiment, the holding reliability of the outer conductor 13 can be improved as compared to the case where the outer conductor 13 is merely press-fit into the housing 14.

Particularly, since the holding recesses 39 of the housing 14 and the holding protrusions 44 of the coupling member 15 are formed to extend in the vertical direction intersecting a mounting direction of the outer conductor 13 and the holding protrusions 44 are fit to the holding recesses 39 in a concave-convex manner, the coupling member 15 and the housing 14 can be reliably prevented from being separated from each other.

Further, the coupling member 15 is electrically conductive, includes the back surface shielding portion 42 for covering the pull-out portions 16 of the first inner conductors 11A from behind, and has shielding performance in addition to a coupling function. As a result, a dedicated shield cover or the like for covering the opening in the rear surface of the outer conductor 13 needs not be separately provided, wherefore an entire configuration can be simplified.

Furthermore, if the connector 10 is mounted on the circuit board 100, the bottom portion 41 is held sandwiched between the outer conductor 13 and the circuit board 100. Thus, the separation of the coupling member 15 from the outer conductor 13 and the housing 14 can be prevented without providing any special locking structure.

Other Embodiments of Present Disclosure

The embodiment disclosed this time should be considered illustrative in all aspects, rather than restrictive.

Although the coupling member is electrically conductive and has shielding performance in the case of the above embodiment, the coupling member may, for example, have only the coupling function of coupling the outer conductor and the housing without having shielding performance as another embodiment. The coupling member having only the coupling function may be an insulating member, e.g. a member made of synthetic resin.

Although the connector is a board connector in the case of the above embodiment, the connector may be a harness connector including an inner conductor to be connected to an end part of a wire as another embodiment.

Although the outer conductor is formed by die casting zinc alloy in the case of the above embodiment, the outer conductor may be, for example, formed by die casting aluminum alloy as another embodiment.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector, comprising:

an electrically conductive inner conductor;

an outer conductor made of die casting and configured to surround the inner conductor;

an insulating housing including a holding recess extending in a vertical direction in a rear end of the insulating housing and into which the outer conductor is mounted, a lower end of the holding recess being open in a bottom surface of the rear end of the insulating housing; and a coupling member including a holding protrusion fit into the holding recess from below and configured to couple the outer conductor and the housing to each other.

2. The connector of claim 1, wherein the holding recess and the holding protrusion are formed to extend in a direction intersecting a mounting direction of the outer conductor into the housing.

3. The connector of claim 1, wherein the inner conductor includes a pull-out portion to be located on a back surface side of the outer conductor, and the coupling member is electrically conductive and includes a back surface shielding portion configured to cover the pull-out portion from the back surface side.

4. The connector of claim 1, wherein:

the inner conductor is connected to a circuit board, and the coupling member includes a bottom portion arranged to be sandwiched between the outer conductor and the circuit board.

5. The connector of claim 4, wherein:

the coupling member is electrically conductive, and the bottom portion of the coupling member includes an opening configured to surround an outer periphery of the inner conductor over an entire periphery.

6. The connector of claim 1, wherein the coupling member includes an end wall connected to a front end of a bottom portion, and the holding protrusion includes a pair of holding protrusions each being gradually laterally widened toward the end wall to form a U shape.

* * * * *